United States Patent
Rodriguez et al.

(10) Patent No.: US 11,680,546 B1
(45) Date of Patent: Jun. 20, 2023

(54) INTAKE MANIFOLD

(71) Applicant: Dixon Valve & Coupling Company, LLC, Chestertown, MD (US)

(72) Inventors: Martin Rodriguez, Middletown, DE (US); Thomas M. Huber, Dover, DE (US)

(73) Assignee: Dixon Valve & Coupling Company, LLC, Chestertown, MD (US)

( * ) Notice: Subject to any disclaimer, the term of this patent is extended or adjusted under 35 U.S.C. 154(b) by 0 days.

(21) Appl. No.: 17/871,305

(22) Filed: Jul. 22, 2022

(51) Int. Cl.
*F02M 35/10* (2006.01)

(52) U.S. Cl.
CPC .......... *F02M 35/10118* (2013.01); *F02M 35/10072* (2013.01)

(58) Field of Classification Search
CPC ....... F02M 35/10118; F02M 35/10072; F02M 35/10091; F02B 77/10; E21B 41/00; F16L 41/02; F04B 53/16
See application file for complete search history.

(56) References Cited

U.S. PATENT DOCUMENTS

| | | | | |
|---|---|---|---|---|
| 4,184,329 A | * | 1/1980 | Ruesch | F01N 13/1805 60/322 |
| 6,629,828 B1 | * | 10/2003 | Johansson | F04B 53/16 285/368 |
| 9,441,776 B2 | * | 9/2016 | Byrne | F04B 15/02 |
| D779,559 S | | 2/2017 | Micken et al. | |
| 9,745,968 B2 | * | 8/2017 | Kotapish | F04B 53/16 |
| 10,151,414 B2 | * | 12/2018 | Micken | F16L 41/02 |
| 2013/0071256 A1 | * | 3/2013 | Kent | F04B 49/10 417/1 |
| 2014/0130887 A1 | * | 5/2014 | Byrne | F04B 15/02 137/15.01 |
| 2016/0369926 A1 | * | 12/2016 | Shuck | F04B 53/16 |

* cited by examiner

*Primary Examiner* — Syed O Hasan
(74) *Attorney, Agent, or Firm* — Howson & Howson LLP

(57) ABSTRACT

An intake manifold is provided having a base plate with discharge ports and an elongate pipe section extending along a face of the base plate. The pipe section has a front end with an intake port and progressively narrows at least adjacent a rear end. A first port in the rear end enables back-flushing of the manifold, and a second port in the rear end is angled relative to the base plate and enables insertion of a probe. Fork-lift openings extend between the base plate and the pipe section enabling the manifold to be lifted and positioned with a lift truck. Side ports extend through the pipe section and are angled relative to the base plate and adjacent one of the discharge ports to enable visual inspection of the discharge port. The side ports may include side ports located on both sides of the pipe section.

20 Claims, 6 Drawing Sheets

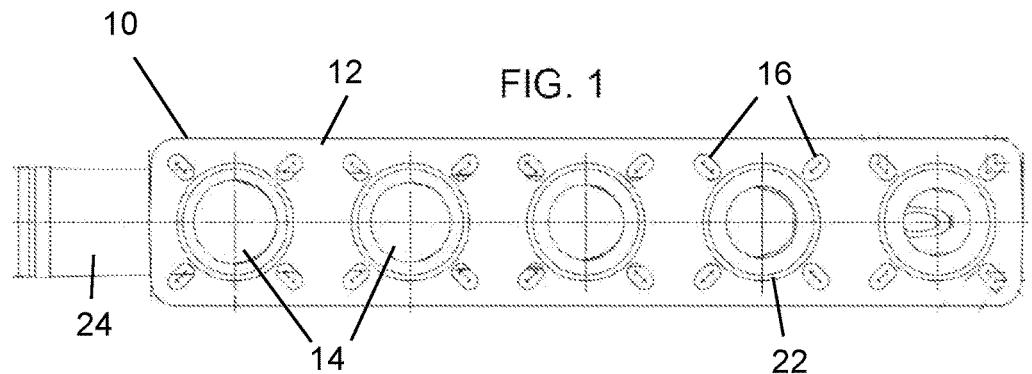
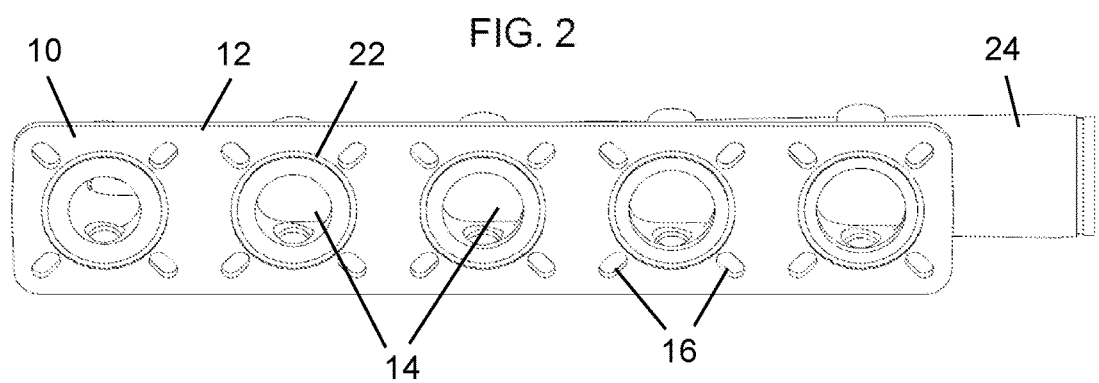
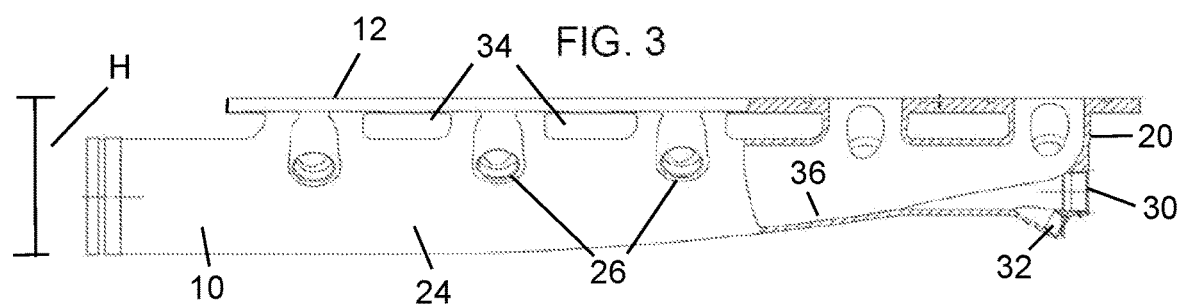
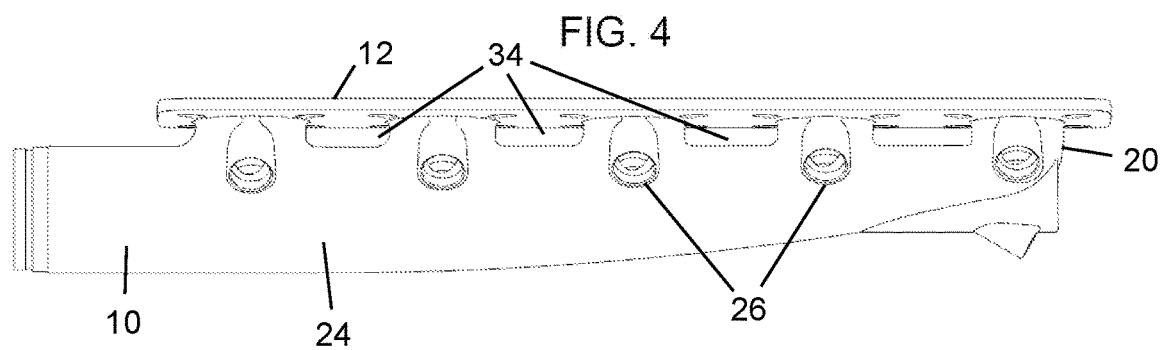

INTAKE MANIFOLD

BACKGROUND

The present invention relates to a manifold that may be used with pumps, such as pumps used in hydraulic fracturing (i.e., frac pumps) or the like.

Hydraulic fracturing (i.e., fracking) is a well-stimulation technique in which rock is fractured by hydraulically pressurized liquid or slurry made of one or more of water, sand, gelatinous proppant, brine, particulate matter, water-based chemicals, water-based acids, or the like. As an example, water and sand may make up about 98 to 99.5 percent of the slurry used in hydraulic fracturing. Hydraulic fracturing is performed after a drilled hole is completed and uses the slurry to create or restore small fractures in a formation in order to stimulate production from new or existing oil and gas wells.

Pumps are used to generate high pressures, such as 15,000 to 17,000 psi, at which the slurry is injected into a wellbore. Intake manifolds are connected to the pumps for receiving a mixture or slurry and feeding the slurry to the pump at a pressure such as 100 to 150 psi.

A conventional intake manifold is formed as a result of welding together several standard pipe fittings mated to a separately machined base plate. Such conventional manifolds have been known to develop leaks through welds and generally produce poor flow patterns. In addition, such conventional intake manifolds do not provide a means for removing debris collected within the manifold without having to completely remove the manifold from the pump.

Additional examples of intake manifolds are disclosed in U.S. Pat. No. 10,151,414 B1 and U.S. Design Pat. No. D779,559 S of the present Applicant.

SUMMARY

According to an embodiment, an intake manifold comprises an integral one-piece manifold body having a base plate with a series of separate spaced-apart discharge ports extending therethrough and an elongate hollow pipe section extending along a face of the base plate and having a front end with an intake port and a normally closed rear end. The elongate hollow pipe section has tapered wall surfaces such that the elongate hollow pipe section progressively narrows and is reduced in size from adjacent the front end to the rear end for directing flow through the manifold body from the intake port through the discharge ports of the base plate. The elongate hollow pipe section has a normally closed first rear end port in the rear end opposite the intake port. The first rear end port is openable to enable back-flushing of the manifold body. The elongate hollow pipe section has a second rear end port in the rear end that is angled relative to the base plate and that enables insertion and mounting of a pressure probe. The manifold body has fork-lift openings extending between the base plate and the elongate hollow pipe section enabling the manifold body to be lifted and positioned with a lift truck.

According to another embodiment, an intake manifold comprising a base plate with a series of separate spaced-apart discharge ports extending therethrough and an elongate hollow pipe section extending along a face of the base plate and having a front end with an intake port and a normally closed rear end. The hollow pipe section has tapered wall surfaces such that the elongate hollow pipe section progressively narrows and is reduced in size from adjacent the front end to the rear end for directing flow through the manifold body from the intake port through the discharge ports of the base plate. The elongate hollow pipe section has a normally closed first rear end port opposite the intake port. The first rear end port is openable to enable back-flushing of the manifold body. The elongate hollow pipe section has a second rear end port in the rear end that is angled relative to the base plate and that enables insertion and mounting of a pressure probe or the like. The manifold body has normally closed side ports extending through a wall of the elongate hollow pipe section such that each of the side ports is angled relative to the base plate and is adjacent one of the discharge ports. When opened, the side ports enable visual inspection of the discharge ports. The side ports are located on both sides of the elongate hollow pipe section relative to the discharge ports to permit reversible installation of the intake manifold relative to a pump.

According to a further embodiment, an assembly includes either of the intake manifolds discussed above with a pump such that the base plate of the manifold body is secured to the pump with each of the discharge ports being aligned with a fluid entry port of the pump.

BRIEF DESCRIPTION OF THE DRAWINGS

FIG. 1 is a plan view of the pump-facing side of an intake manifold in accordance with an embodiment.

FIG. 2 is an image of the pump-facing side of an intake manifold in accordance with an embodiment.

FIG. 3 is a side elevational view of the intake manifold of FIG. 1 shown in partial cross-section.

FIG. 4 is a side elevational view of the intake manifold of FIG. 1.

DETAILED DESCRIPTION

Figure 13:
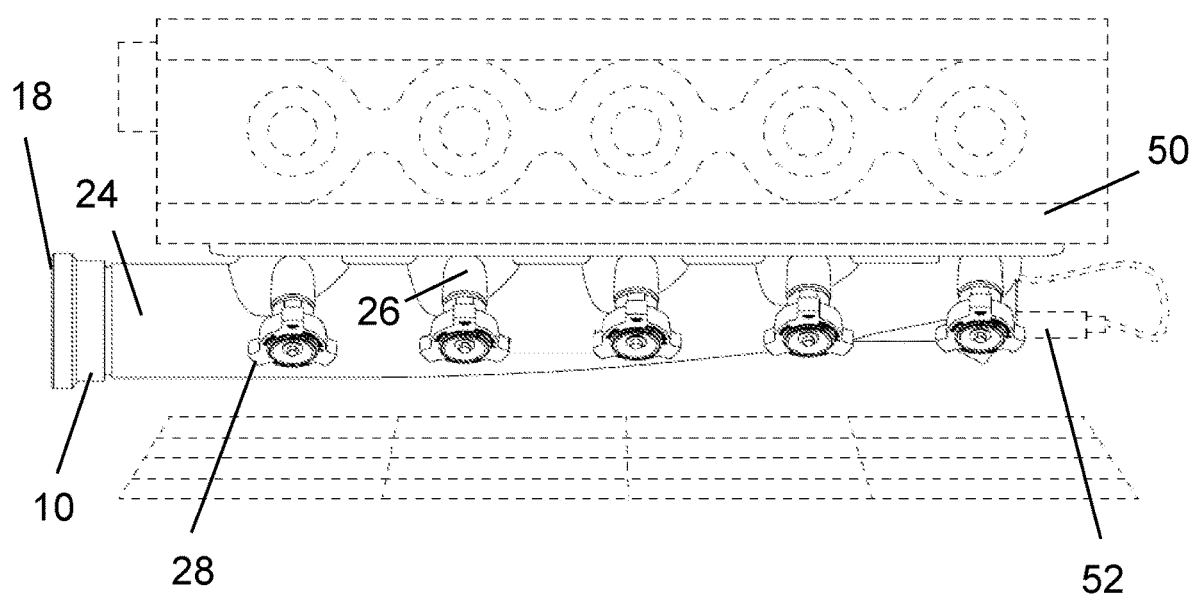
FIG. 13 is an image from the side of the intake manifold of FIG. 2 secured to a pump in accordance with an embodiment.
Figure 14:
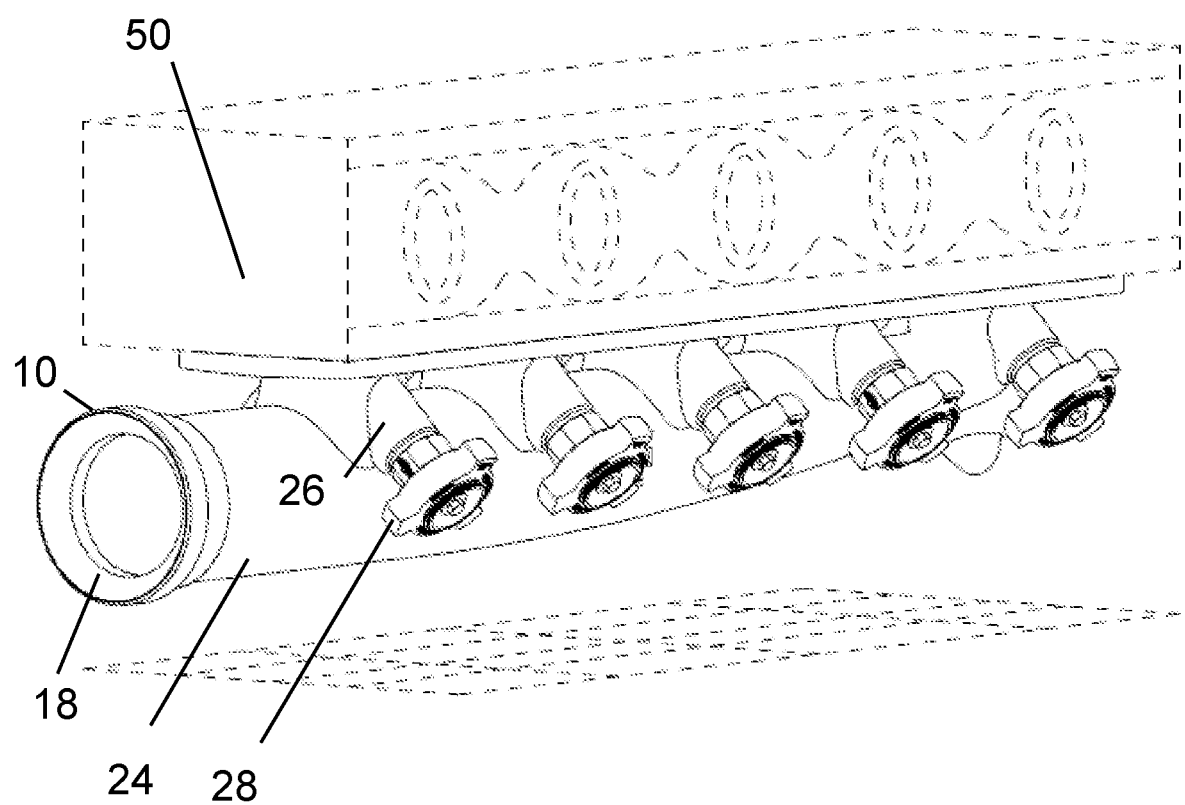
FIG. 14 is an image of the intake manifold of FIG. 2 secured to a pump in accordance with an embodiment.

According to an embodiment, a five-port intake manifold 10 is provided that may be connected to a low-pressure side (i.e., intake side) of a hydraulic fracturing pump (frac pump) 50 for feeding liquid, slurry, or the like to a frac pump 50 (see FIGS. 13 and 14 for the pump 50). The illustrated embodiment of the manifold 10 may be sized to fit a five-port fluid end of a frac pump. For instance, see FIGS. 1 and 2. However, other embodiments may include any number, arrangement, or spacing of ports as required by the pump, such as three or more ports or any other number of ports.

Unlike conventional intake manifolds that are welded together from several separate standard pipe fittings, the manifold 10 is formed as a one-piece machined casting of metal, such as ductile iron, stainless steel, or the like. Accordingly, the intake manifold 10 is without any threaded connections and welds or the like conventionally used to connect separately produced parts of a manifold. Additionally, the flow path formed and provided by the one-piece machined casting intake manifold 10 eliminates problems such as sand drop out and cavitation typically experienced with conventional intake manifolds. Further, the one-piece cast manifold 10 enables the inside walls of the manifold 10 to be smooth and tapered without any bulges, projections, disruptions, etc. that would disturb smooth flow of slurry or the like through the manifold. For instance, see the interior surfaces 36 of the manifold 10 shown in FIGS. 3 and 7.

The manifold 10 includes a flange/base plate 12 formed with five discharge ports 14 and a series of bolt holes 16 surrounding each discharge port 14. See FIGS. 1 and 2. The bolt holes 16 are used for attaching the manifold 10 to a fluid inlet end of a frac pump 50 (see FIGS. 13 and 14) with bolts or like fasteners. The manifold 10 shown in FIGS. 1 and 2 has five discharge ports 14 which are equally spaced-apart and aligned in a row extending from an intake port 18 of the manifold 10 at the front of the manifold 10 to a rear end 20 of the manifold. The flange/base plate 12 includes a series (five) of O-ring grooves 22 for receiving resilient O-rings (not shown) that provide sealing of mating surfaces of the manifold 10 to the frac pump 50. The intake port 18 may be provided, for instance, as a six-inch nominal diameter pipe that is configured with male National Pipe Thread (NPT), grooved (Victaulic/Grinnell style) groove or hammer union connections, or the like. Of course, other sizes and connection types may be used.

The flange/base plate 12 extends generally perpendicular to the intake port 18 of the manifold 10 such that the liquid or slurry generally flows into the manifold 10 in a first direction generally parallel to the base plate 12 and flows out of the manifold through the series of the discharge ports 14 defined by and through the flange/base plate 12 in a second direction generally offset by about 90° to the first direction of flow through the intake port 18. For instance, flow into the manifold 10 may be along a horizontal direction and flow out of the manifold through the discharge ports may be along a vertical direction (i.e., see FIGS. 13 and 14). Of course, this may be varied, as needed and as required by the pump.

The manifold 10 is produced and designed to provide even fluid/slurry flow from the intake port 18 to each of the discharge ports 14 and to eliminate dead flow spots that may allow solids, such as sand and other particulate matter, to drop out of the slurry due to gravity or the like. Each of the discharge ports 14 of the manifold 10 may match or substantially match the adjacent inlet port of the frac pump 50.

Figure 7:
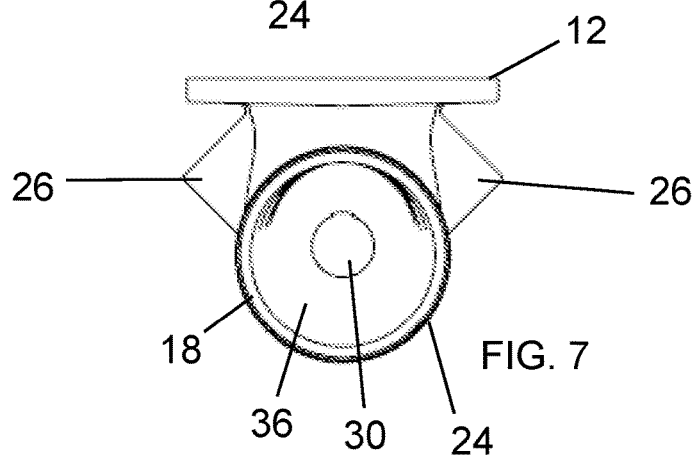
FIG. 7 is an elevational view of the front or intake end of the intake manifold of FIG. 2.
Figure 8:
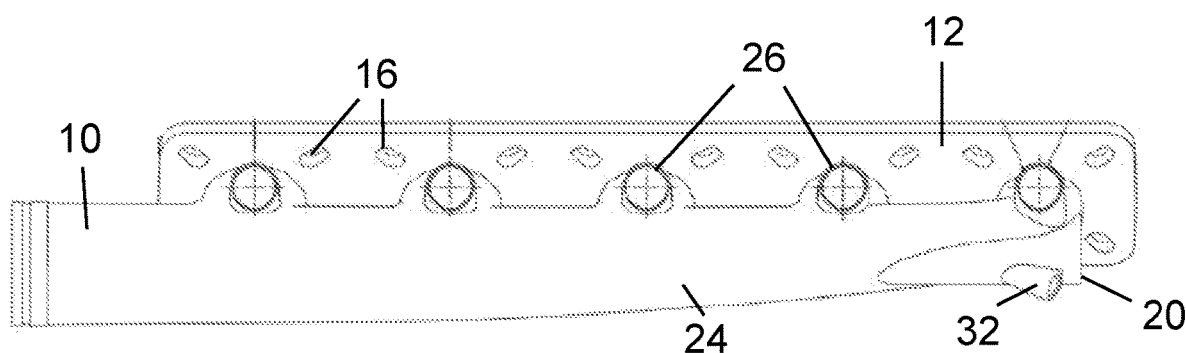
FIG. 8 is a perspective view of the intake manifold of FIG. 2.
Figure 9:
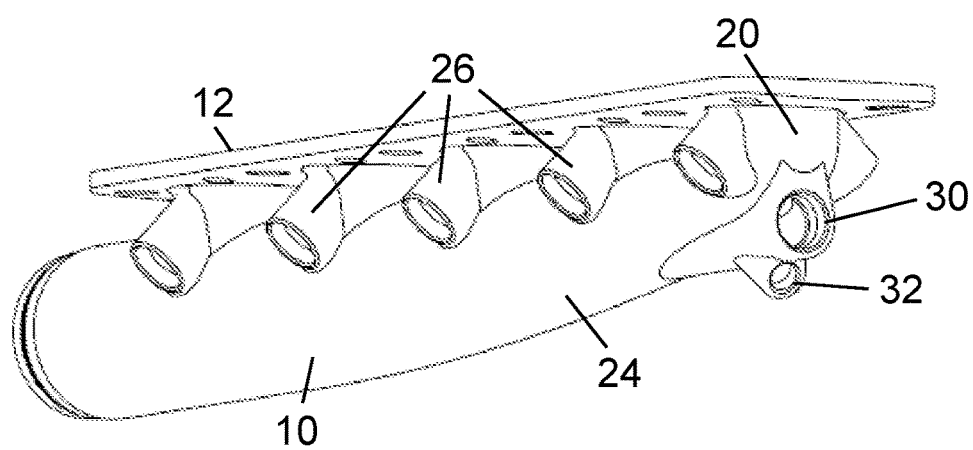
FIG. 9 is a perspective view from a right side of the intake manifold of FIG. 2.
Figure 10:
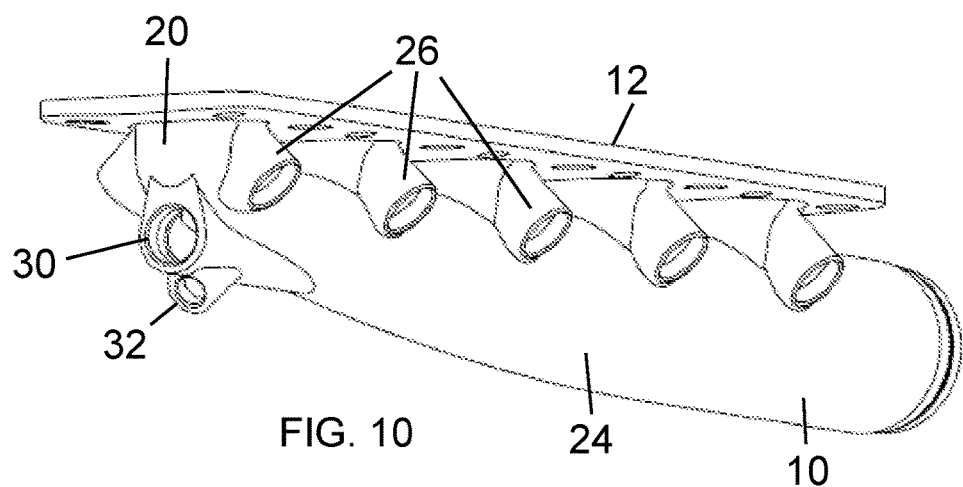
FIG. 10 is a perspective view from a left side of the intake manifold of FIG. 2.

The manifold 10 includes an elongate hollow pipe section 24 that extends along the length of the manifold 10 and that smoothly and progressively tapers or narrows from adjacent the intake port 18 to the rear end 20 of the manifold 10 and that is connected to the flange/base plate 20 to an extent needed to span and interconnect to all of the discharge ports 14. As best shown in FIGS. 3 and 7, the elongate hollow section portion 24 is hollow continuously between the intake port 18 at the front of the manifold 10 and the closed end at the rear end 20 of the manifold 10 and has smooth tapered inner wall surfaces that extend therebetween and are without uneven surfaces formed by welds or like connections.

Figure 11:
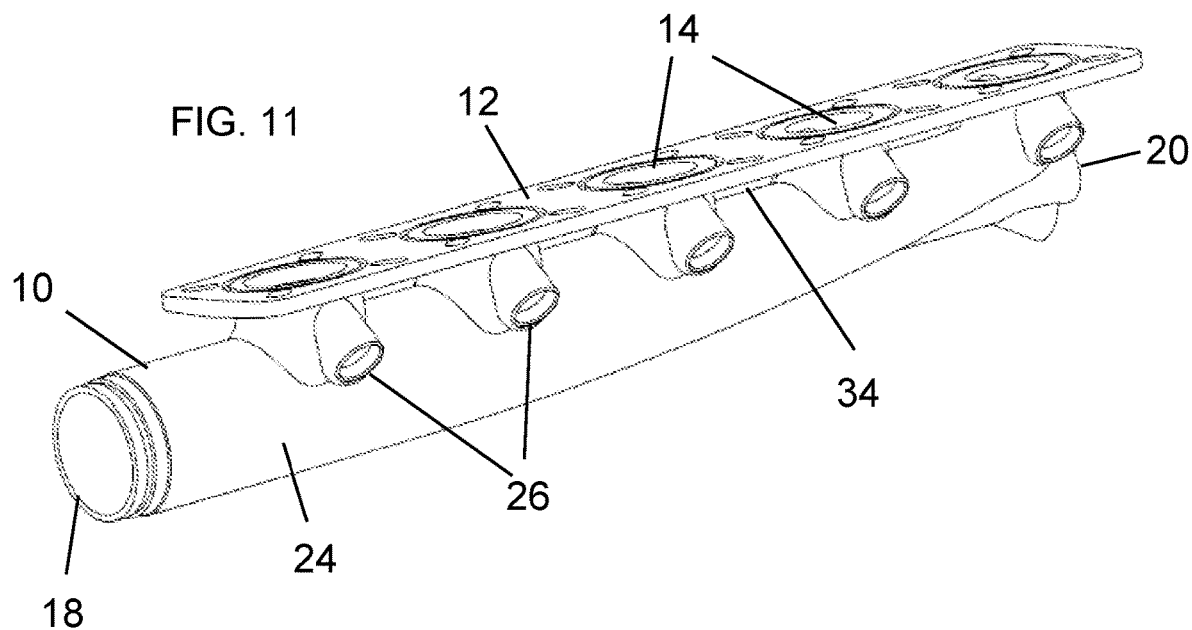
FIG. 11 is a perspective view from a right side of the intake manifold of FIG. 2.
Figure 12:
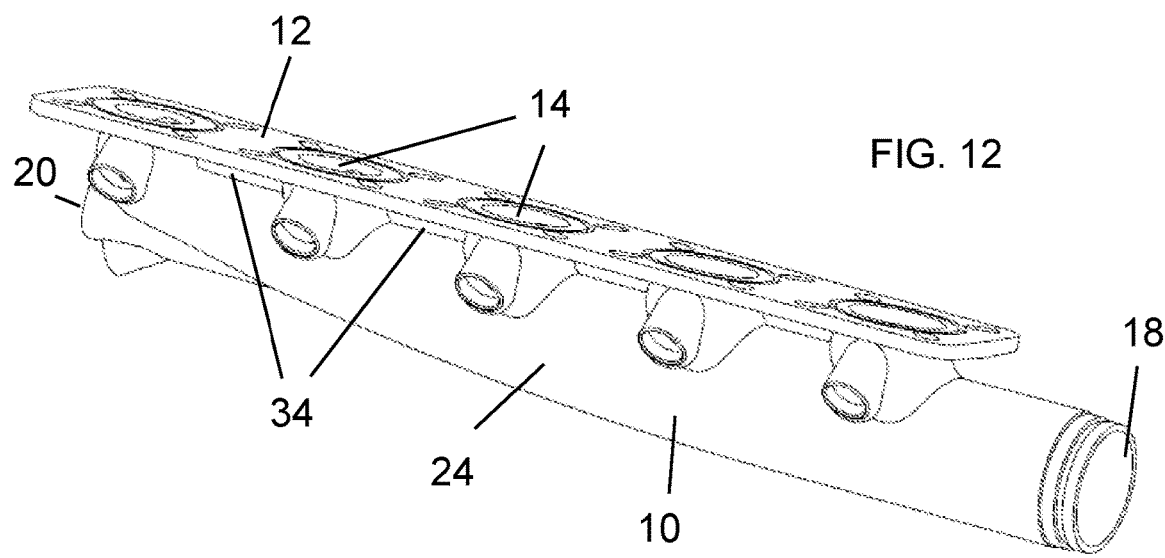
FIG. 12 is a perspective view from a left side of the intake manifold of FIG. 2.

The intake manifold 10 include a series of normally sealed closed angled side clean-out/inspection ports 26, that, when unsealed, permit visibility into each intake cylinder of the attached pump and permit clean out adjacent each discharge port 14 of the manifold. As best shown in FIGS. 11 and 12, there is one side clean-out/inspection port 26 for each discharge port 14 on each side (left and right) of the manifold 10. Accordingly, for a manifold 10 having five discharge ports 14, there is ten side clean-out/inspection ports 26, five along one side of the manifold 10 and five along an opposite side of the manifold 10. This arrangement of side clean-out/inspection ports 26 on both sides of the manifold 10 enables the manifold 10 to be connected to the pump 50 facing either direction thereby permitting the manifold 10 to be bi-directional. For example, as best shown in FIGS. 13 and 14, the manifold 10 is mounted on an underside of the pump 50 such that the intake port 18 of the manifold 10 is located on one side of the pump 50 (i.e., toward the left as shown in FIG. 13). However, if needed, the manifold 10 shown in FIG. 13 could be reversed such that the intake port 18 is located to the right of the pump 50. A set of five side clean-out/inspection ports 26 would be available for use regardless of such arrangement.

During normal operation of the pump 50, each of the side clean-out/inspection ports 26 may be sealed closed with a cap 28 or the like, for instance, as shown in FIGS. 13 and 14. However, if inspection or clean-out is desired, the caps 28 may be removed and the interior of the manifold 10 and/or pump cylinders may be inspected and cleaned out. Each side clean-out/inspection port 26 may be provided, for instance, as two-inch female NPT side ports angled to permit direct visibility to each intake port of the frac pump 20 and each discharge port 14 of the manifold 10. Thus, the side ports 26 may be angled relative to the flange/base plate 12 and are aligned with the discharge ports 14 for purposes of facilitating clean out and inspection of the manifold 10 and fluid ports of the frac pump 50. The angle may be, for instance, 30° to 60° relative to the flange/base plate 12, such as 45°.

Figure 5:
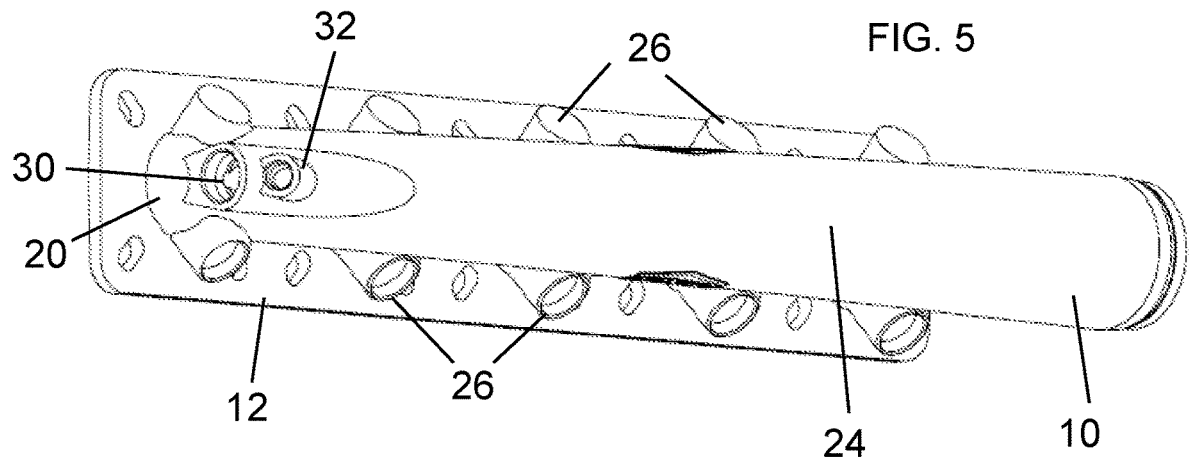
FIG. 5 is an image of an opposite side of the intake manifold of FIG. 2.
Figure 6:
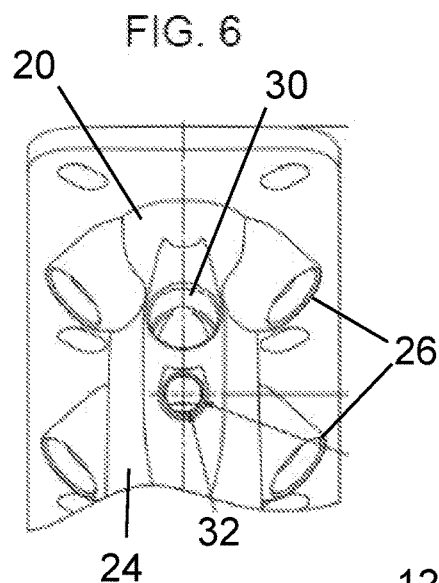
FIG. 6 is a partial perspective view of a rear end of the intake manifold of FIG. 2.

The manifold 10 also includes end ports, 30 and 32, in the rear end 20 of the manifold 10 opposite the intake port 18. For instance, see FIGS. 5 and 6. These end ports, 30 and 32, are sealed closed during normal operation of the manifold 10. However, the end port 30, which is larger than the end port 32, may be opened and accessed, for instance, to enable a back-flushing operation of the intake manifold 10 to clear any unwanted debris collected within the manifold 10. The end port 32 provides a port to which a pressure sensor 52, other senser, camera, or the like used to monitor conditions within the manifold 10 at the low-pressure feed side of the frac pump 50 may be connected and used during normal operations.

The end port 30 may be provided, for instance, as a two-inch female NPT connection and may be used for back flushing or other purpose. The end port 32 may be provided, for instance, as a one-inch female NPT connection and may be used for insertion of a pressure probe or for other purposes. The end port 30 may extend parallel to the flange/base plate 10, and the end port 32 may extend at an angle to the flange/base plate 12 at an angle similar to that of the side ports 26.

The overall height "H" of the manifold 10 is relatively reduced in comparison to conventional manifolds for purposes of permitting direct attachment to a fluid end of the pump 50 without removal or raising of the fluid end up of the pump 50 off a trailer or similar support structure. See FIGS. 13 and 14. In addition, as best shown in FIGS. 3 and 4, the manifold 10 includes a series of fork-lift slots or pockets 34 to facilitate mounting of the manifold 10 to an underside of the pump 50. Thus, the manifold 10, which may weight around 300 pounds and be about five feet in length, may be lifted, moved, and positioned for installation or removal with the forks of a fork-lift truck via use of the pockets 34.

One fork-lift pocket 34 may extend between each adjacent pair of discharge ports 14. For example, as shown in FIGS. 3 and 4, there are four pockets 34 for the manifold 10 which has five discharge ports 14. Each pocket 34 is provided as a through-hole slot that extends adjacent the side of the base plate 12 on the side of base plate 12 to which the elongate hollow section 24 of the manifold extends. Thus, the pockets 34 extend transversely or substantially perpendicular to the elongate hollow section 24 of the manifold 10 and are sized to receive the forks of a fork-lift truck.

Merely for purposes of example, the flange/base plate 12 of the intake manifold 10 may have dimensions of about 52 inches by about 10 inches, and the manifold 10 may have an overall length "L" of about 60 inches and an overall height "H" of about 8.5 inches. The manifold 10 may be made of iron and weight approximately 225 to 275 pounds and may be designed to handle about 300 gallons per minute (gpm) of flow at about 100 to 150 pounds per square inch (psi). Of course, the dimensions, weight, and material of the manifold 10 and its flow and pressure capabilities may be altered, as needed.

Accordingly, the streamlined tapered design of the manifold 10 provides smooth flow of slurry therethrough. In addition, the taper and progressive narrowing of the elongate hollow section 24 functions to accelerate the slurry as the slurry moves through the manifold. This, in turn, prevents solid matter such as sand and other particulates suspended in the slurry from dropping out and collecting in the manifold and further provides even and uniform flow to each of the multiple discharge ports 14 provided by the manifold 10. The side ports 26 of the manifold, provided on both sides of the manifold 10, are provided at an angle that readily permits direct visibility to each discharge port 14 of the manifold 10 and intake port of the frac pump 50 to facilitate clean out and inspection thereof without the need to disassemble the manifold 10 from the pump 50. Further, since the side ports 26 are provided on each side of the manifold 10, the manifold 10 can be installed to a pump 50 with the intake port 18 oriented in a direction as desired (i.e., in a reversible direction). The end ports, 30 and 32, of the manifold 10 enable back flushing, pressure probe insertion, and the like without disassembling the manifold from the pump. The fork-lift slots or pockets 34 enable readily lifting of the manifold 10 during installation or removal relative to a pump 50.

The foregoing description and specific embodiments are merely illustrative of the principles thereof, and various modifications and additions may be made to the apparatus by those skilled in the art, without departing from the spirit and scope of this invention.

We claim:

1. An intake manifold, comprising:
   an integral one-piece manifold body having a base plate with a series of separate spaced-apart discharge ports extending therethrough and an elongate hollow pipe section extending along a face of said base plate and having a front end with an intake port and a normally closed rear end;
   said elongate hollow pipe section having tapered wall surfaces such that said elongate hollow pipe section narrows and is reduced in size at least adjacent said rear end for directing flow through said manifold body from said intake port through said discharge ports of said base plate;
   said elongate hollow pipe section having a normally closed first rear end port in said rear end opposite said intake port, said first rear end port is openable to enable back-flushing of said manifold body;
   said elongate hollow pipe section having a second rear end port in said rear end that is angled relative to said base plate and that enables insertion and mounting of a pressure probe; and
   said manifold body has fork-lift openings extending between said base plate and said elongate hollow pipe section enabling said manifold body to be lifted and positioned with a lift truck.

2. The intake manifold according to claim 1, wherein the fork-lift openings extend across said face of said base plate in a direction transverse to said elongate hollow pipe section.

3. The intake manifold according to claim 2, wherein said fork-lift openings include a single fork-lift opening extending between each adjacent pair of said discharge ports.

4. The intake manifold according to claim 1, wherein said manifold body includes normally closed side ports extending through a wall of the elongate hollow pipe section, each of said side ports being angled relative to said base plate and being adjacent one of said discharge ports such that, when opened, enables visual inspection of said adjacent one of said discharge ports.

5. The intake manifold according to claim 4, wherein said side ports include side ports located on opposite sides of said elongate hollow pipe section.

6. The intake manifold according to claim 4, wherein said manifold body has a pair of side ports for each of said discharge ports such that, for each of said discharge ports, said pair of side ports are located on opposite sides of said elongate hollow pipe section.

7. The intake manifold according to claim 1, wherein the manifold body is cast as a single integral piece.

8. The intake manifold according to claim 1, wherein said series of discharge ports includes three or more uniformly spaced and sized ports, and wherein the elongate hollow pipe section spans and extends over said series of discharge ports.

9. An intake manifold, comprising:
   an integral one-piece manifold body having a base plate with a series of separate spaced-apart discharge ports extending therethrough and an elongate hollow pipe section extending along a face of said base plate and having a front end with an intake port and a normally closed rear end;
   said elongate hollow pipe section having tapered wall surfaces such that said elongate hollow pipe section progressively narrows and is reduced in size at least adjacent said rear end for directing flow through said manifold body from said intake port through said discharge ports of said base plate;
   said elongate hollow pipe section having a normally closed first rear end port in said rear end opposite said intake port, said first rear end port is openable to enable back-flushing of said manifold body;
   said elongate hollow pipe section having a second rear end port in said rear end that is angled relative to said base plate and that enables insertion and mounting of a pressure probe;
   said manifold body having normally closed side ports extending through a wall of the elongate hollow pipe section, each of said side ports being angled relative to said base plate and being adjacent one of said discharge ports such that, when opened, enables visual inspection of said adjacent one of said discharge ports; and said side ports including side ports located on opposite sides of said elongate hollow pipe section.

10. The intake manifold according to claim 9, wherein said side ports include a pair of side ports located on opposite sides of said elongate hollow pipe section for each one of said discharge ports.

11. The intake manifold according to claim 10, wherein said manifold body has fork-lift openings extending between said base plate and said elongate hollow pipe section enabling said manifold body to be lifted and positioned with a lift truck.

12. The intake manifold according to claim 11, wherein said fork-lift openings extend across said face of said base plate in a direction transverse to said elongate hollow pipe section.

13. The intake manifold according to claim 12, wherein said fork-lift openings include a single fork-lift opening extending between each adjacent pair of said discharge ports.

14. The intake manifold according to claim 9, wherein the manifold body is cast as a single integral piece.

15. The intake manifold according to claim 9, wherein said series of discharge ports includes three or more uniformly spaced and sized ports, and wherein the elongate hollow pipe portion spans and extends over said series of discharge ports.

16. An assembly including an intake manifold and a pump, comprising:
   a pump; and
   an integral one-piece intake manifold comprising a base plate with a series of spaced apart discharge ports and an elongate hollow pipe section;
   said base plate of said manifold body being secured to said pump such that each of said discharge ports are aligned with a fluid entry port of said pump;
   said elongate hollow pipe section having a front end with an intake port and a normally closed rear end and extending along one side of said base plate such that said elongate hollow pipe section defines a flow passage communicating with each of said discharge ports;
   said elongate hollow pipe section having tapered wall surfaces such that said elongate hollow pipe section progressively narrows and is reduced in size at least adjacent said rear end for directing flow through said manifold body from said intake port through said discharge ports of said base plate;
   said elongate hollow pipe section having a normally closed first rear end port in said rear end opposite said intake port, said first rear end port is openable to enable back-flushing of said manifold body;
   said elongate hollow pipe section having a second rear end port in said rear end that is angled relative to said base plate and that enables insertion and mounting of a pressure probe; and
   said manifold having normally closed side ports extending through the elongate hollow pipe section, each of said side ports being angled relative to said base plate and being adjacent one of said discharge ports such that, when opened, enables visual inspection of said adjacent one of said discharge ports; and
   said side ports including side ports located on opposite sides of said elongate hollow pipe section.

17. The assembly according to claim 16, wherein said side ports include a pair of side ports located on opposite sides of said elongate hollow pipe section for each one of said discharge ports.

18. The assembly according to claim 16, wherein said manifold body has fork-lift openings extending between said base plate and said elongate hollow pipe section enabling said manifold body to be lifted and positioned relative to said pump with a lift truck.

19. The assembly according to claim 18, wherein said fork-lift openings extend across said face of said base plate in a direction transverse to said elongate hollow pipe section.

20. The assembly according to claim 19, wherein said fork-lift openings include a single fork-lift opening extending between each adjacent pair of said discharge ports.

\* \* \* \* \*